Nov. 22, 1966  C. W. RICHTER  3,286,354

GAGE PLATE

Filed Aug. 25, 1964  2 Sheets-Sheet 1

INVENTOR.
Carl W. Richter

BY
Barnes, Kisselle, Raisch & Choate
ATTORNEYS

Nov. 22, 1966  C. W. RICHTER  3,286,354
GAGE PLATE
Filed Aug. 25, 1964   2 Sheets-Sheet 2
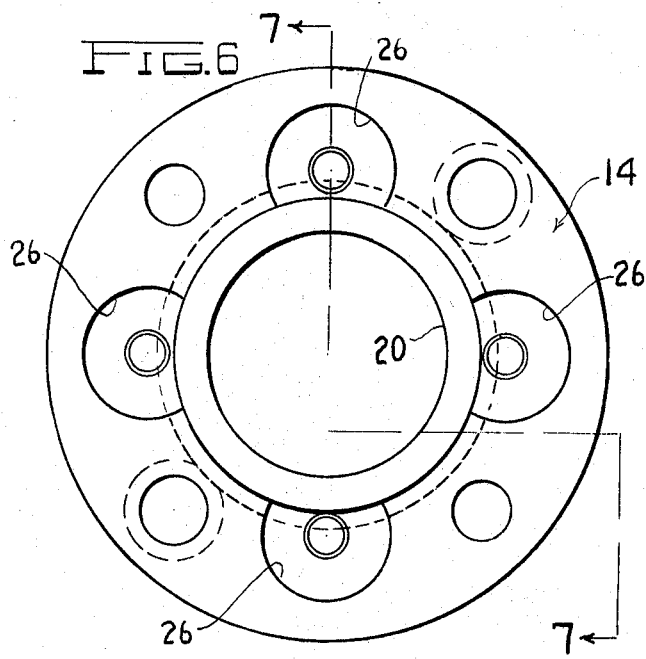
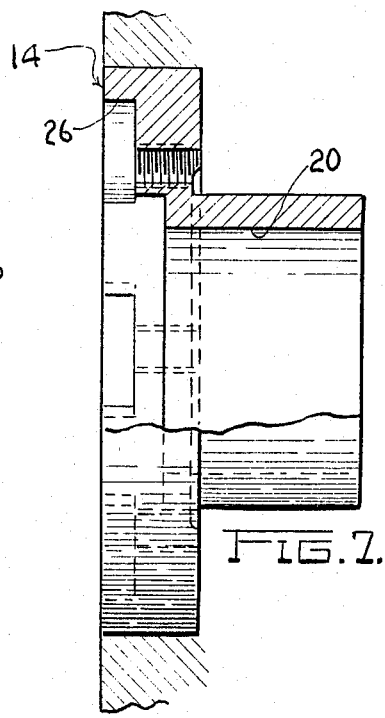
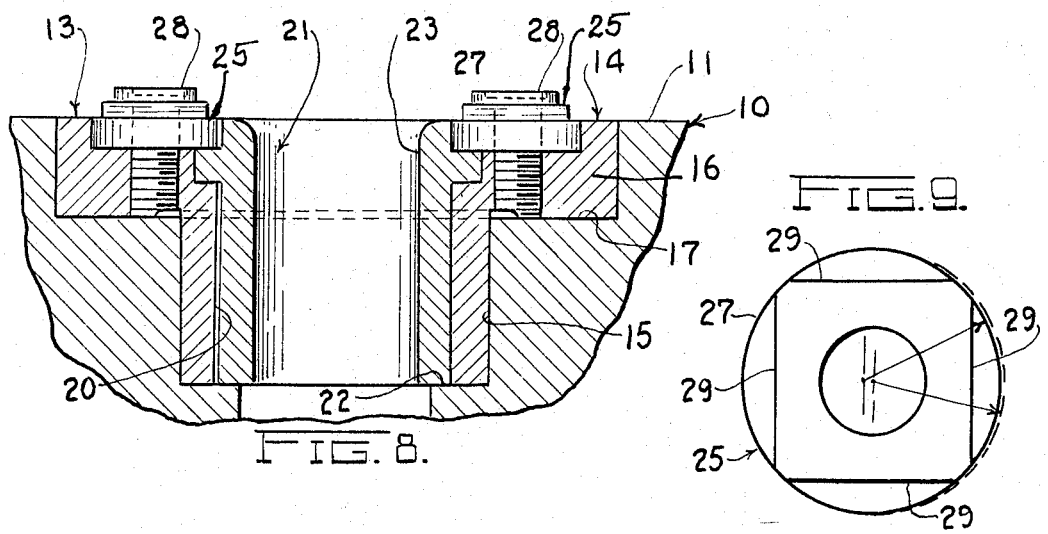
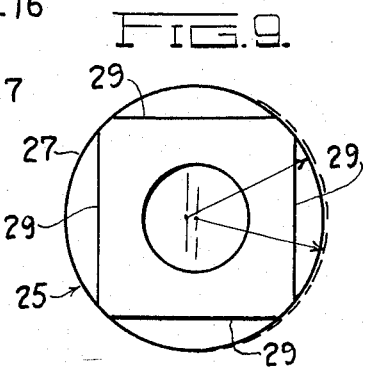
INVENTOR.
Carl W. Richter 3,286,354
GAGE PLATE
Carl W. Richter, Detroit, Mich.
(11450 Stephens Road, Warren, Mich.)
Filed Aug. 25, 1964, Ser. No. 391,912
8 Claims. (Cl. 33—174)

This invention relates to gage plates and particularly to gage plates for setting body fixtures and the like.

Gage plates for setting body fixtures and the like conventionally comprise a base and an accurately formed top surface with a plurality of circumferentially spaced accurately formed and located openings therein. Such a gage plate is expensive and time consuming to manufacture because each opening must be very accurately located with relation to the other openings. In addition, any changes in temperature in use cause the gage plate to lose its accuracy.

It is therefore an object of this invention to provide a gage plate which is relatively less expensive and less time consuming to manufacture and which can have the locating openings therein adjusted to compensate for changes in temperature and other conditions.

In the drawings:

FIG. 6 is a plan view of the retainer utilized in the locating assembly shown in FIG. 3.

FIG. 7 is a sectional view taken along the line 7—7 in FIG. 6.

FIG. 8 is a fragmentary sectional view taken along the line 8—8 in FIG. 3.

FIG. 9 is a plan view of a cam member utilized in the assembly shown in FIG. 3.

Figure 1:
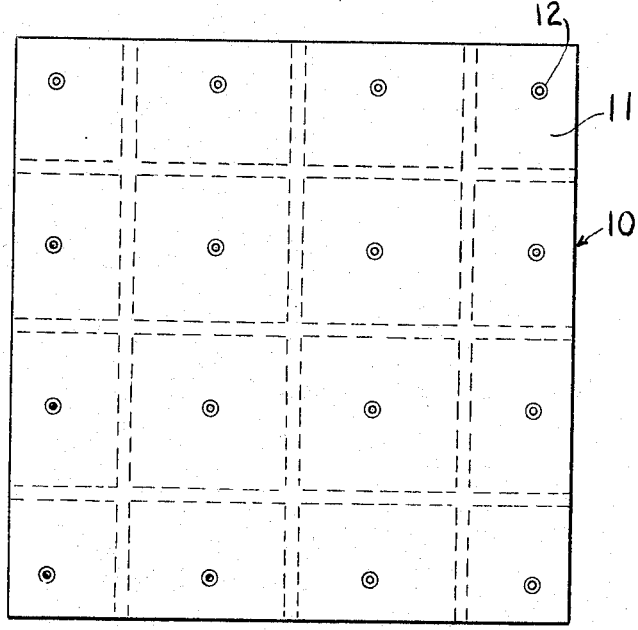
FIG. 1 is a plan view of a gage plate embodying the invention.
Figure 2:
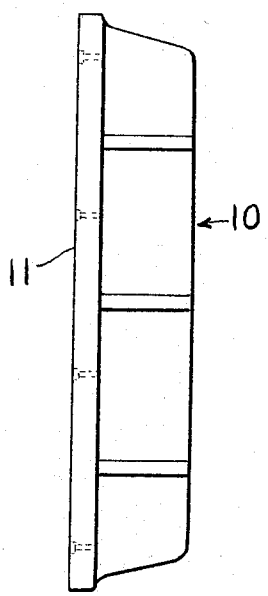
FIG. 2 is an end view of the gage plate shown in FIG. 1.

Referring to FIG. 1, the gage plate 10 embodying the invention is made of a casting or the like defining a gaging surface 11 having a plurality of accurately formed circumferentially spaced openings 12 to serve as locating points for checking gaging fixtures and the like.

Figures 3, 4, 5:
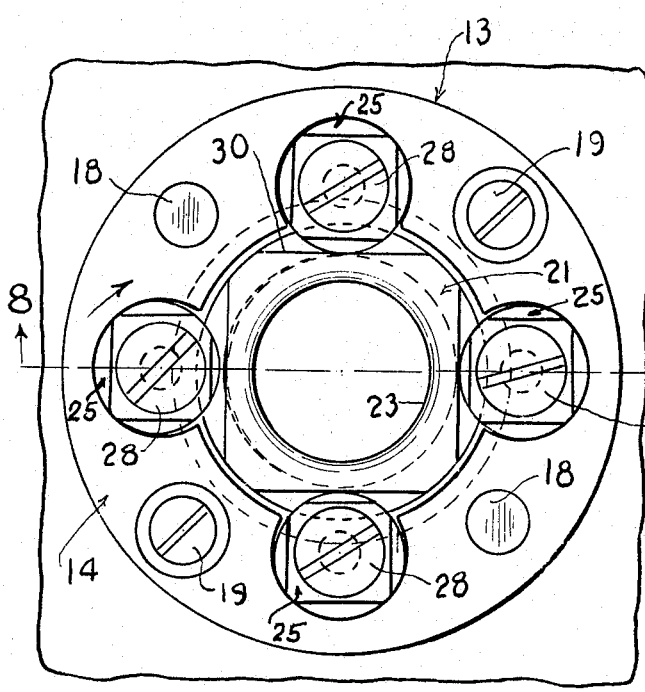
FIG. 3 is a fragmentary view on an enlarged scale, parts being broken away, of a locating assembly utilized in the gage plate shown in FIG. 1.
FIG. 4 is a part sectional elevation of a bushing utilized in the assembly shown in FIG. 3.
FIG. 5 is an end view of the bushing shown in FIG. 4.

In accordance with the invention, each of the locating points 12 is defined by a locating assembly 13. (FIGS. 3, 8). Each locating assembly 13 comprises a retainer 14 that fits into an opening 15 and also includes a peripheral flange 16 that engages a shoulder 17 in the base 10. The retainer 14 is held in position by dowel pins 18 and set screws 19. The retainer 14 is in turn formed with an opening 20 in which a bushing 21 is positioned with the bottom of the bushing 21 engaging a shoulder 22 in the base 10.

Each bushing 21 is formed with an accurately defined circular locating surface 23 that forms the locating point 12, previously referred to.

However, the outer diameter of the bushing 21 is slightly less than the diameter of the opening 20 in the retainer 14 so that the bushing 21 can be moved with respect to the retainer in order to accurately position the center of the opening 23.

A plurality of cam members 25 are provided at circumferentially spaced points in recesses 26 in the flange 16 of retainer 14. Each cam member includes an eccentric cam portion 27. Each cam member 25 is locked in position on retainer 14 by a set screw 28 threaded into flange 16. The upper end of each cam member 25 is formed with flats as at 29 to facilitate engagement of the cam member by an open end wrench for accurately rotating the cam member 25 and turning the cam 27. Bushing 21 is formed with flat portions on its upper end. The cam 27 of each cam member 25 engages a flat 30 on the periphery of the bushing 21 to move the bushing 21 and hold it in adjusted position.

In practice, the base 10 is assembled with the roughly positioned openings 15 therein and machined to receive the retainers 14. The bushings 21 are then inserted and adjusted by manipulating the cam members 25 to accurately position the openings 23 of the bushing members 21 and thereby provide proper locating points. In the event that temperature changes cause the various locating points to become misaligned, the cam members 25 can be adjusted by loosening the set screws 28 to reposition the bushing 21 in relation to one another.

It can thus be seen that there has been provided a gage plate which is relatively less expensive and less time consuming to manufacture and which provides locating points that can be adjusted to compensate for temeprature and other changes.

I claim:
1. A gage plate comprising
a base having a gaging surface,
a plurality of spaced openings in said gaging surface of said base,
a bushing in each said opening having accurately formed locating opening therein,
and means for adjusting the position of said bushing in its respective opening comprising a plurality of eccentric cams rotatably engaging the periphery of said bushing, said bushing having flat portions thereon engaged by said cams, and means for locking each said cam in rotatably adjusted position.

2. A gage plate comprising
a base having a flat gaging surface,
said gaging surface having a plurality of spaced openings therein,
and a locating bushing assembly in at least one of said openings,
said locating bushing assembly comprising a retainer mounted in said opening,
said retainer having an opening therein,
a bushing having a lesser diameter than said opening positioned in the opening of said retainer,
a plurality of circumferentially spaced locating means mounted on said retainer and movable radially inwardly to engage the periphery of said bushing and accurately position said bushing in the opening of said retainer,
each said locating means comprising an eccentric cam,
and means for rotatable mounting said cam and locking said cam on said retainer,
said bushing having a plurality of circumferentially spaced flat portions engageable by said cams.

3. A gage plate comprising
a base having a flat gaging surface,
said gaging surface having a plurality of spaced openings therein,
and a locating bushing assembly in at least one of said openings,
said locating bushing assembly comprising a retainer mounted in said opening,
said retainer having an opening therein,
a bushing having a lesser diameter than said opening positioned in the opening of said retainer,
a plurality of circumferentially spaced locating means mounted on said retainer and movable radially inwardly to engage the periphery of said bushing and accurately position said bushing in the opening of said retainer, each said locating means comprising an eccentric cam,
and means for rotatably mounting said cam and locking said cam on said retainer,
the upper end of each said cam being non-circular to facilitate engagement by a wrench.

4. The combination set forth in claim 3 wherein said means for locking said cam comprises a screw extending through each said cam for locking said cam in rotatably adjusted position.

5. A gage plate comprising
a base having a flat gaging surface,
said gaging surface having a plurality of spaced openings therein,
and a locating bushing assembly in at least one of said openings,
said bushing assembly comprising a retainer mounted in said opening,
said retainer having a peripheral flange and an opening therein,
said opening in said base having a shoulder engaged by said flange,
a bushing having a lesser diameter than said opening in said retainer positioned in the opening of said retainer,
a plurality of circumferentially spaced locating means mounted on said flange of retainer and movable radially inwardly to engage the periphery of said bushing,
each said locating means comprising an eccentric cam,
and means for rotatably mounting said cam and locking said cam on said flange of said retainer,
said bushing having a plurality of circumferentially spaced flat portions engageable by said cams.

6. A gage plate comprising
a base having a flat gaging surface,
said gaging surface having a plurality of spaced openings therein,
and a locating bushing assembly in at least one of said openings,
said locating bushing assembly comprising a retainer mounted in said opening,
said retainer having an opening therein,
a bushing having a lesser diameter than said opening positioned in the opening of said retainer,
means for supporting said bushing in said opening for movement bodily laterally of said opening,
a plurality of circumferentially spaced locating means mounted on said retainer and movable laterally inwardly to engage the periphery of said bushing and accurately position said bushing laterally in the opening of said retainer.

7. The combination set forth in claim 5 wherein the upper end of each said cam is non-circular to facilitate engagement by a wrench.

8. The combination set forth in claim 7 including a screw extending through each said cam for locking said cam in rotatably adjusted position.

References Cited by the Examiner

UNITED STATES PATENTS

| | | | |
|---|---|---|---|
| 449,039 | 3/1891 | Fietsch | 269—235 X |
| 1,008,115 | 11/1911 | Clark | 269—235 X |
| 2,495,891 | 1/1950 | Davis | 33—174 |
| 2,879,599 | 3/1959 | Masinda | 33—125 |

LEONARD FORMAN, *Primary Examiner.*